(12) United States Patent
Kacines

(10) Patent No.: US 11,076,534 B1
(45) Date of Patent: Aug. 3, 2021

(54) HOOK AND LATTICE ADJUSTABLE WREATH HANGER

(71) Applicant: Jeffery J. Kacines, Allen, TX (US)

(72) Inventor: Jeffery J. Kacines, Allen, TX (US)

( * ) Notice: Subject to any disclaimer, the term of this patent is extended or adjusted under 35 U.S.C. 154(b) by 0 days.

(21) Appl. No.: 16/705,513

(22) Filed: Dec. 6, 2019

(51) Int. Cl.
*A01G 5/04* (2006.01)

(52) U.S. Cl.
CPC ..................... *A01G 5/04* (2013.01)

(58) Field of Classification Search
CPC ........................................ A01G 5/04
See application file for complete search history.

(56) References Cited

U.S. PATENT DOCUMENTS

| | | | | |
|---|---|---|---|---|
| 1,204,044 A | * | 11/1916 | McFaddin | F21V 17/00 362/453 |
| 3,853,226 A | * | 12/1974 | Hine | A47G 1/1606 211/104 |
| 4,032,102 A | * | 6/1977 | Wolf | A47G 7/047 248/318 |
| 4,709,888 A | * | 12/1987 | Cubit | F16L 3/221 248/68.1 |
| D349,447 S | * | 8/1994 | Daniller | D8/367 |
| 5,553,823 A | | 9/1996 | Protz, Jr. | |
| 6,299,118 B1 | * | 10/2001 | Farrell | A47G 7/047 248/317 |
| 6,302,365 B1 | | 10/2001 | Catanzarite et al. | |
| 6,311,851 B1 | | 11/2001 | Knudsen, Sr. et al. | |
| 6,575,416 B1 | | 6/2003 | Avinger | |
| 6,854,610 B2 | | 2/2005 | Adams | |
| 6,857,608 B2 | * | 2/2005 | Avinger | A01G 5/04 248/215 |
| 7,121,416 B2 | * | 10/2006 | Shea | A47F 5/0807 211/87.01 |
| 7,234,671 B2 | | 6/2007 | Avinger | |
| 7,845,604 B2 | * | 12/2010 | Connor, Jr. | A47G 7/044 248/215 |
| 7,887,017 B2 | * | 2/2011 | Moran | B44C 5/00 248/339 |
| 7,988,116 B2 | | 8/2011 | Kacines | |
| 7,992,833 B1 | | 8/2011 | Goodman et al. | |
| D702,540 S | | 4/2014 | Kacines | |
| 9,247,785 B1 | | 2/2016 | Kacines | |
| D848,826 S | | 5/2019 | Williams | |

(Continued)

*Primary Examiner* — Anita M King
(74) *Attorney, Agent, or Firm* — Roger N. Chauza, PC

(57) ABSTRACT

An adjustable over-the-door hanger for suspending an item at a desired vertical location with respect to the door. A fixed hanger part includes a hanger for engaging over an upper edge of the door. The fixed hanger part has plural rows of holes and plural columns of holes and plural hook members. An adjustable hook part of the over-the-door hanger has a hook for hanging a decorative item therefrom. The adjustable hook part further includes plural rows and plural columns of holes and plural hook members. The fixed hanger part and the adjustable hook part are engaged together by engaging the hook members of the fixed hanger part extension strip with the holes of the adjustable hook part extension strip, and vice versa. The vertical adjustment of both the hook and thus the decorative item is obtained by selecting which holes in a row are to be used for insertion of the respective hook members. A stopper can be employed to maintain the parts engaged together.

20 Claims, 10 Drawing Sheets

(56) References Cited

U.S. PATENT DOCUMENTS

| | | | |
|---|---|---|---|
| 2007/0001088 A1* | 1/2007 | Bowman | A01G 9/04 248/690 |
| 2013/0083517 A1* | 4/2013 | Bratton | F21V 21/088 362/191 |

* cited by examiner

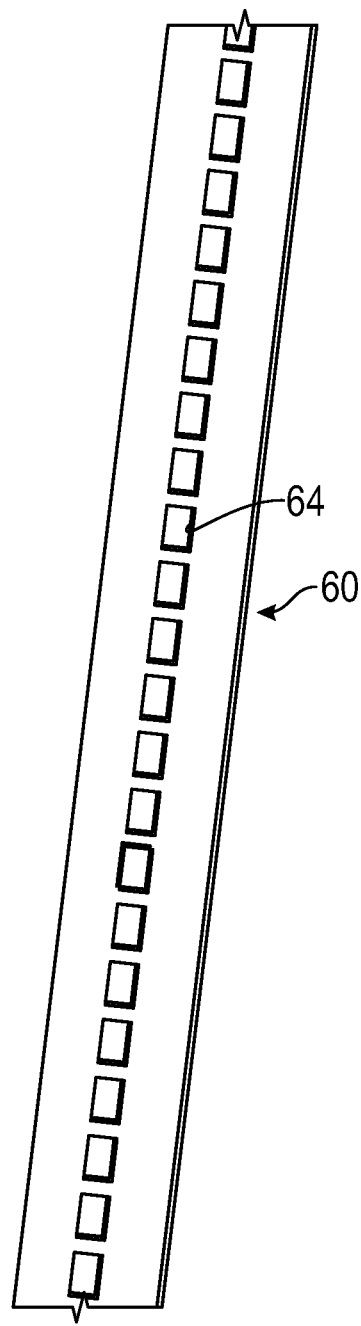 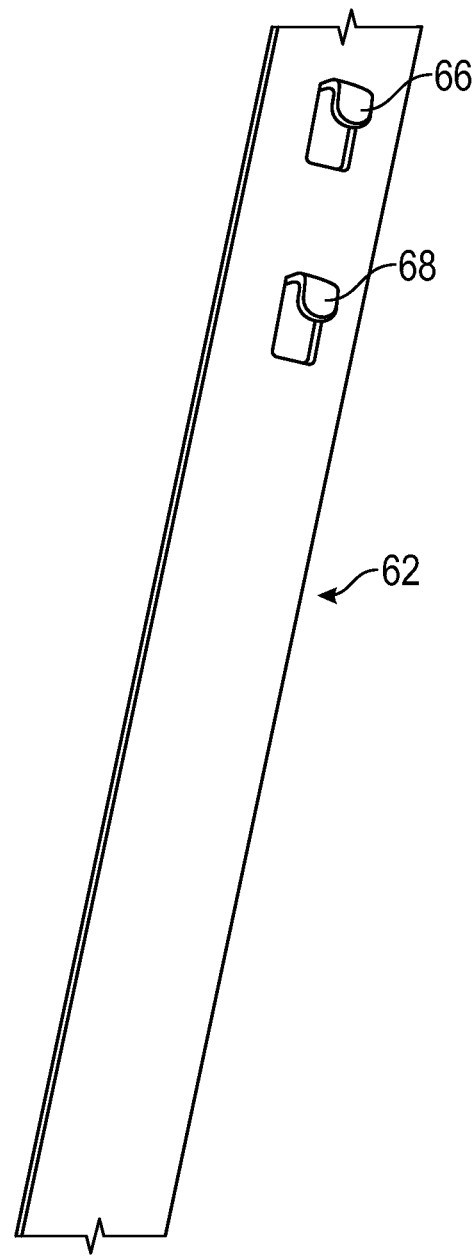
FIG. 12  FIG. 13

HOOK AND LATTICE ADJUSTABLE WREATH HANGER

TECHNICAL FIELD OF THE INVENTION

The present invention relates in general to hanger mechanisms for hanging items therefrom, and more particularly to methods and apparatus for hanging items from a door, where the door hanger is easily adjustable in length.

BACKGROUND OF THE INVENTION

Door hangers of various types are in widespread use to hang items from a door and display the item. It is convenient to use a closet door from which to hang clothes, shoes, etc., therefrom to free up additional storage area in the closet. The typical door hanger is a one-piece plastic or metal device that has a hanger channel at the top for engaging the top edge of the door to suspend the hanger therefrom. A lower loop of the hanger is employed to hang wire hangers and clothes thereon. Such types of hangers are also employed in connection with kitchen cabinet doors to hang dish towels and other items therefrom.

Door hangers are also used to suspend holiday decorations on the front surface of a door. The hanger is simply installed over the top edge of the front door while it is open. Then, the door is closed so that the top thin body of the hanger does not interfere with the space between the top edge of the door and the top of the door sill. Such type of door hangers are constructed with a channel-shaped top portion that fits over the top edge of the door. One vertical part of the channel extends downwardly along the front surface of the door and terminates in a hook for hanging decorations therefrom. Typical door hangers of this type are easily installed to display decorations therefrom, and then are easily removed and stored away during times of nonuse of the decorations. The over-door-hanger is advantageous as it is easily constructed and thus cost effective, and does not require the door to be damaged or altered due to nail or screw holes formed therein. Many of the over-the-door hangers are constructed as one-piece items, and are thus are not adjustable in length.

Users of the over-the-door hangers often use such hangers with different sizes of decorations, and desire that the decoration be placed vertically with respect to the door at a certain location so as to be aesthetically pleasing. Accordingly, door hangers are available that are constructed so that the length thereof is adjustable. With this hanger construction, the length of the outer part of the door hanger is adjustable so that the decoration hung therefrom is at the desired vertical location with respect to the door. One such over-the-door decoration hanger is disclosed in U.S. Pat. No. 10,477,776, by Kacines.

Various other adjustable over-the-door hangers are disclosed in U.S. Pat. No. 5,553,823 by Protz, Jr.; U.S. Pat. No. 6,311,851 by Knudsen, Sr. et al.; U.S. Pat. No. 6,575,416 by Avinger; U.S. Pat. No. 6,854,610 by Adams; U.S. Pat. No. 7,234,671 by Avinger; and U.S. Pat. No. 7,992,833 by Goodman et al.

While the foregoing and other adjustable over-the-door hangers are effective, they are often complicated to construct and thus are expensive. In addition, many of the known door hangers are difficult to adjust the length thereof, and require tools. Accordingly, there is a need for an over-the-door type of hanger that is aesthetically pleasing, simple to construct, includes few parts and is thus very cost effective.

SUMMARY OF THE INVENTION

In accordance with the principles and concepts of the invention, and in its simplest form, disclosed is a two-part adjustable over-the-door hanger that has an upper fixed hanger part engageable at different vertical locations with a lower adjustable hook part. The fixed hanger part includes an extension strip that hangs adjacent a surface of the door, where the extension strip includes plural upturned hook members. The adjustable hook part of the over-the-door hanger has a hook for hanging a decorative item therefrom. The adjustable hook part further includes an extension strip that is perforated with holes in which the hook members of the fixed hanger extension strip are inserted and engaged therewith. The hook members of the fixed hanger part can be inserted into a selected set of holes of the extension strip of the adjustable hook part to thereby hang the decorative item at a desired vertical location with respect to the door.

In another form, a feature of the invention is that both the fixed hanger part and the adjustable hook part both include perforated extension strips with respective hook members. The hook members of the fixed hanger part engage within holes of the adjustable hook part, and vice versa. This arrangement of hook members and holes provides stability to the door hanger once the fixed and adjustable parts are engaged together.

Another feature of the invention is that the hook members of the extension strip of the fixed hanger part are oriented upwardly and the hook members of the extension strip of the adjustable hook part are oriented downwardly, thereby firmly maintaining attachment of the parts together when the door is swung open or closed.

A further feature of the invention is that the extension strips of both the fixed hanger part and the adjustable hook part can be fabricated with a decorative design that identifies the season or holiday that relates to the decorative item hung from the door hanger.

An additional feature of the door hanger of the invention is that the extension strips both include plural rows of holes and plural columns of holes, thus forming an array of holes. With plural rows of holes, the effective length of the door hanger can be adjusted. With plural columns of holes, multiple hook members can be utilized to provide rigidity and stability to the door hanger when the fixed hanger part and the adjustable hook part are engaged together.

An aspect of the invention is that readjustment of the door hanger is easy, as the adjustable hook part can be removed from the fixed hanger part by moving the parts vertically a small amount with respect to each other to disengage the hook members from the respective holes, and inserting the hook members in different rows of holes.

An additional aspect of the invention is that only two parts are required for the door hanger to function for its intended purpose. Moreover, the two parts can be easily engaged together so that the effective length of the door hanger is changed. With only two parts, the fabrication is made easy, and the product is more cost effective.

In accordance with an embodiment of the invention, disclosed is an over-the-door hanger for hanging a decorative item on a door, which includes a fixed hanger part having a door hanger member for placing the over-the-door hanger on a top edge of the door, and the fixed hanger part has an extension strip. An adjustable hook part has a hook for suspending the decorative item therefrom, and the adjustable hook part also has an extension strip. A vertical arrangement of holes is formed in one of the extension strips, and one or more hook members are formed with the other said extension strip. The one or more hook members are adapted for engaging within the respective holes. Whereby, the one or more of hook members can be engaged with the holes at different vertical locations to thereby locate the decorative item suspended from the hook at a desired vertical location with respect to the door.

According to another embodiment of the invention, disclosed is an over-the-door hanger for hanging a decorative item on a door, where the door hanger includes a fixed hanger part having a door hanger member for hanging the over-the-door hanger on the door, and the fixed hanger part has an extension strip with at least one vertical column of holes and with at least one hook member. Further included is an adjustable hook part that has a hook for suspending the decorative item therefrom, and the adjustable hook part has an extension strip with at least one column of vertical holes and with at least one hook member. Each of the hook members of the adjustable hook part is adapted for engaging within a respective hole of the fixed hanger part, and each hook member of the fixed hanger part is adapted for engaging within a respective hole of the adjustable hook part. Wherein the hook members can be engaged with respective holes at different vertical locations to thereby locate the decorative item suspended from the hook at a desired location with respect to the door. When the fixed hanger part and the adjustable hook part are engaged together via the hook members and respective holes, a portion of the extension strip of the fixed hanger part overlaps a portion of the extension strip of the adjustable hook part, and the holes of the overlapping extension strip of the fixed hanger part align with the holes of the overlapping extension strip of the adjustable hook part.

With regard to a further embodiment of the invention, disclosed is a method of adjusting an over-the-door hanger for hanging a decorative item on a door. The method includes installing a fixed hanger part of the over-the-door hanger over a top edge of the door so that an extension strip of the fixed hanger part lies adjacent a face surface of the door. An adjustable hook part having an extension strip and having a hook for hanging the decorative item therefrom is manipulated for attachment of the extension strip of the adjustable hook part to the extension strip of the fixed hanger part. The method further includes selecting one or more holes of a plurality of holes formed in one extension strip that should be employed to hang the decorative item at a desired vertical location with respect to the door. At least one hook member formed on the other extension strip is engaged within the selected one or more holes to thereby hang the decorative item at the desired vertical location.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 12 is an isometric view of a portion of an extension strip having a single column of holes;

FIG. 13 is an isometric view of a portion of an extension strip having a pair of hook members;

DETAILED DESCRIPTION OF THE INVENTION

Figure 1:
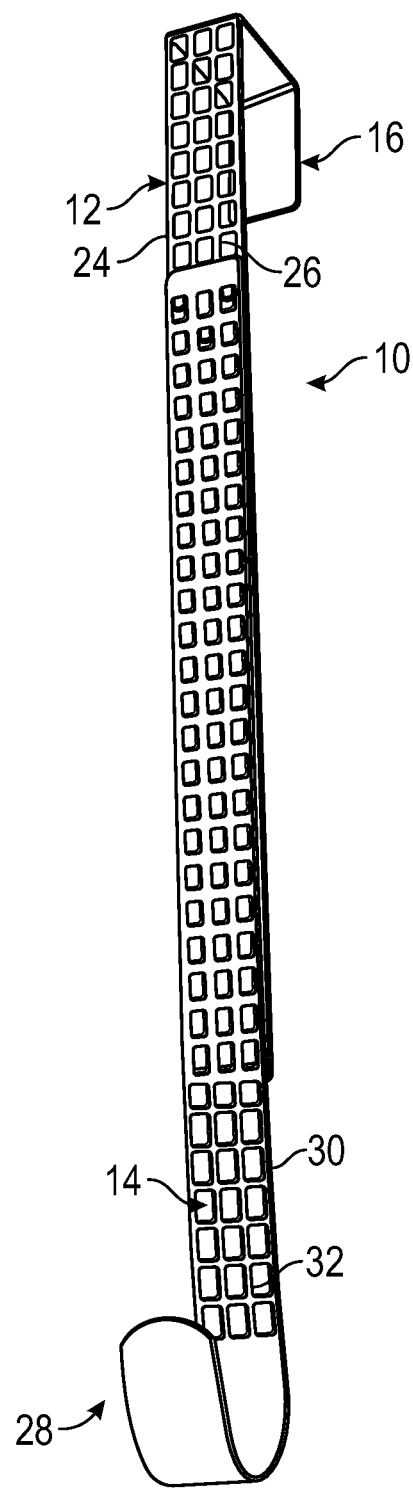
FIG. 1 is an isometric view of the two-part door hanger with the parts engaged together and ready for use.
Figure 2:
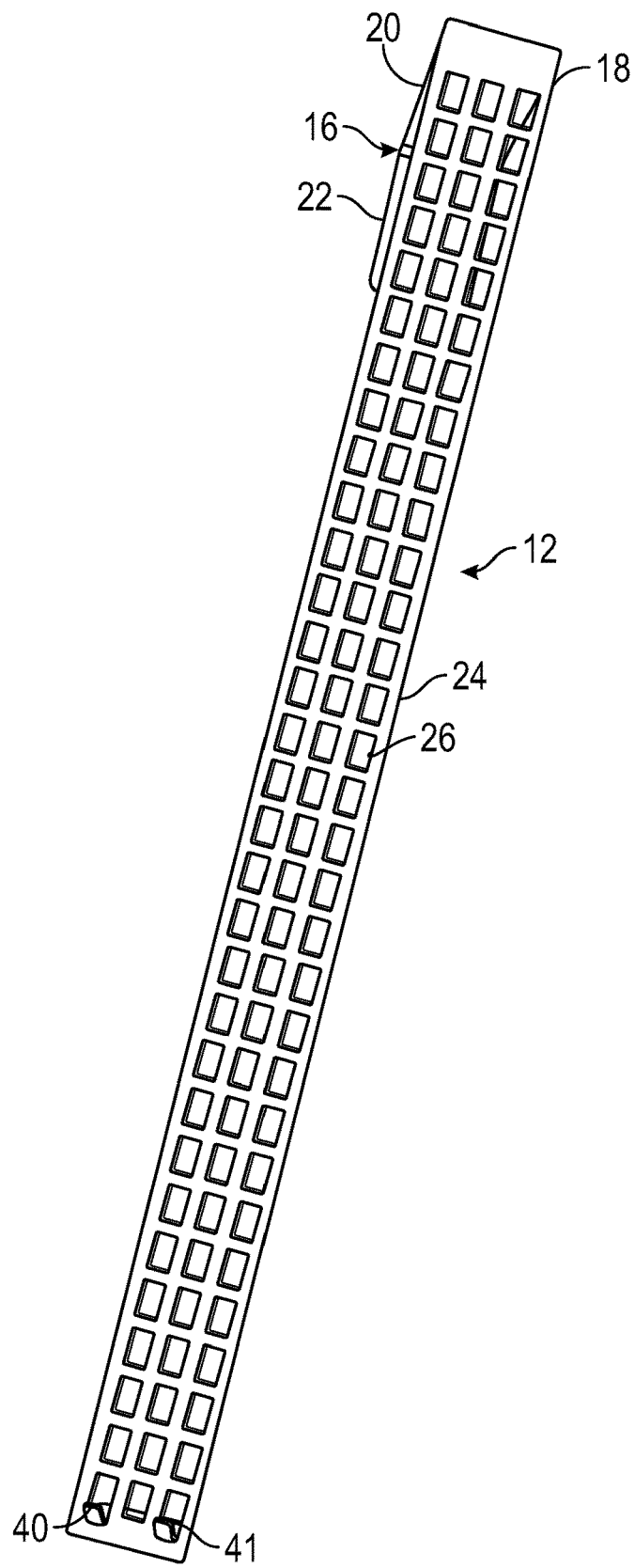
FIG. 2 is an isometric view of the fixed hanger part of the door hanger of FIG. 1.
Figure 3:
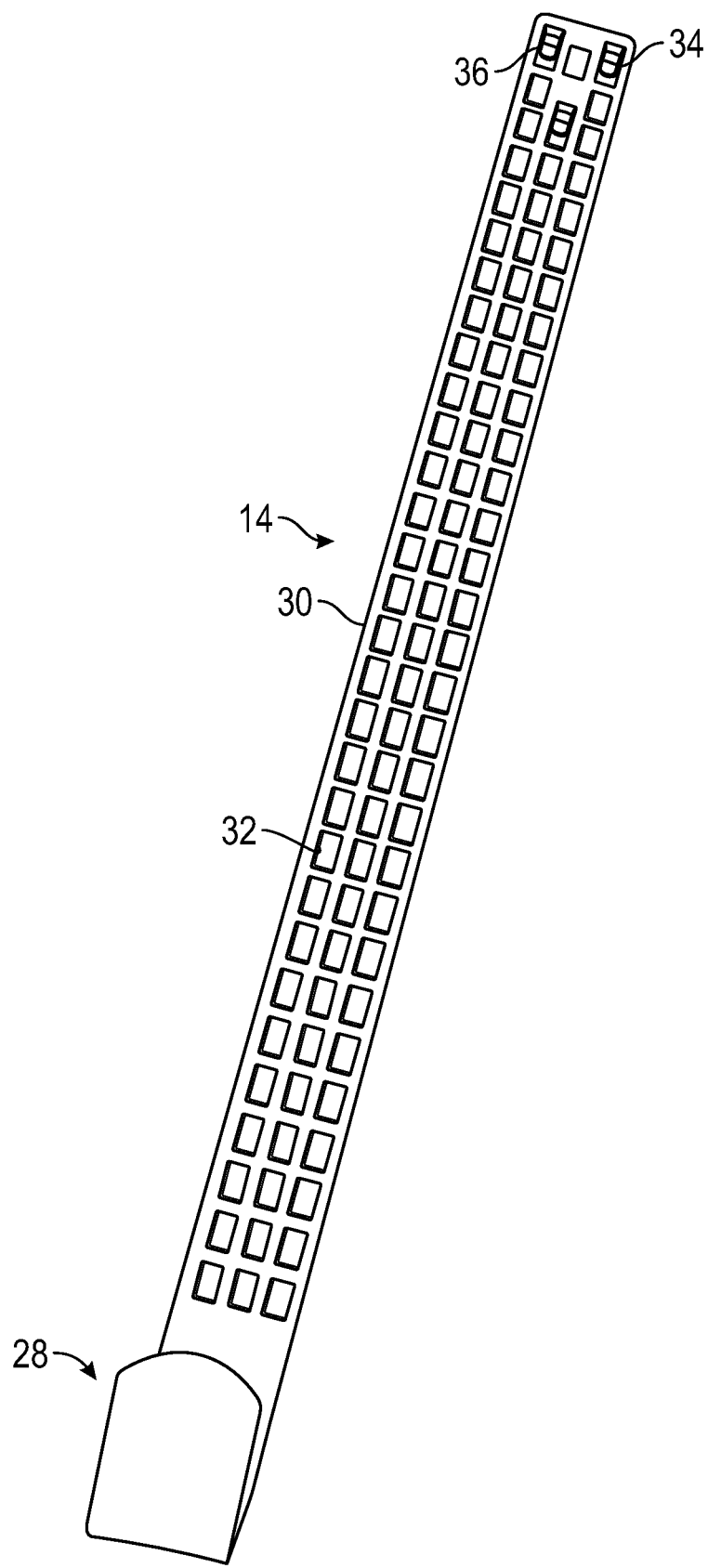
FIG. 3 is an isometric view of the adjustable hook part of the door hanger of FIG. 1.

FIG. 1 illustrates the two-part over-the-door hanger 10 when assembled or engaged together and installed over the top edge of any type of door (not shown), such as an exterior door of a residence or business. FIGS. 2 and 3 illustrate the respective fixed hanger part 12 and the adjustable hook part 14 separated from each other. In accordance with an embodiment of the invention, the fixed hanger part 12 is fixed with respect to the door so that it does not move vertically. The adjustable hook part 14 is movable vertically to different positions with respect to the fixed hanger part 12.

Figure 4:
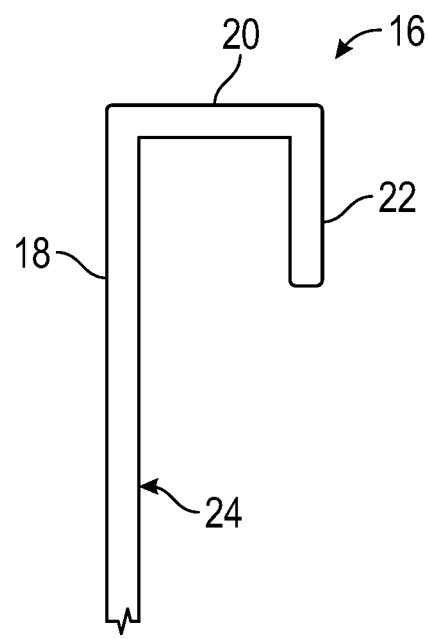
FIG. 4 is a side view of a portion of the fixed hanger part showing the hanger member.

The fixed hanger part 12 includes a door hanger member 16 shown in more detail in FIG. 4. The door hanger member 16 includes an outer downwardly depending part 18 that extends to an extension strip that engages the outer surface of the door. The downwardly depending part 18 is connected with a right angle to a lateral part 20 that overlies the upper edge of the door. The door hanger member 16 further includes an inner downwardly depending part 22 that is connected with a right angle to the lateral part 20 so that the downwardly depending part 22 engages the inner surface of the door. The door hanger member is thus channel shaped. The lateral space between the outer downwardly depending part 18 and the inner downwardly depending part 22 is such that typical door thicknesses can be accommodated.

The fixed hanger part 12 is constructed with a fixed extension strip 24 having plural columns of vertical apertures or holes, as well as plural rows of horizontal apertures or holes. One hole of the extension strip 24 is illustrated as numeral 26. The columns and rows of holes formed in the extension strip 24 define a lattice or array of holes 26. In one embodiment, the holes 26 are each formed as respective rectangular-shaped openings. Square or other shaped holes can be employed. As can be seen from FIGS. 1 and 2, the holes 26 are formed along the entire width and length of the extension strip 24. In the embodiment illustrated, the fixed extension strip 24 also includes a pair of hook members 40 and 41 located at the bottom end thereof. The hook members 40 and 41 of the extension strip 24 are hooked upwardly as illustrated in more detail in FIG. 8.

The width of the fixed extension strip 24 can be about one inch, as well as many other widths. The length of the fixed extension strip 24 can be, for example, about thirteen inches long, but many other extension strip lengths can be employed. The door hanger 10 can be fabricated using sheet steel that is stamped to form the parts, and then bent into the various shapes using conventional machines. The door hanger 10 can be coated with a suitable covering to protect it from the outside environment. In particular, the door hanger 10 can be painted, powder coated or otherwise processed to provide a covering that resists damage from moisture, the sun and the like. As an alternative, the door hanger 10 can be molded using a suitable plastic or other synthetic material.

Figure 5:
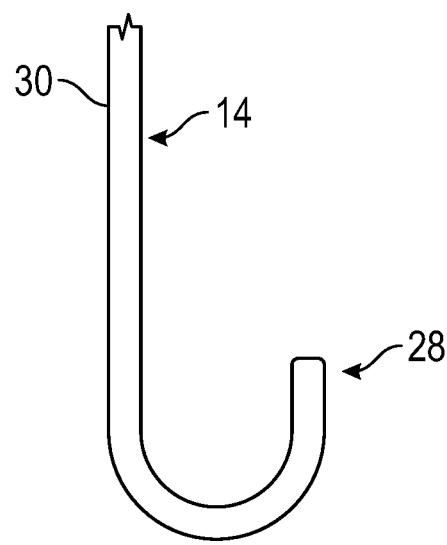
FIG. 5 is a side view of a portion of the adjustable hook part showing the hook.

Removably attached to the fixed hanger part 12 is the adjustable hook part 14 having attached thereto a bottom hook 28 shown in detail in FIG. 5. The hook 28 is formed with a curved end that is oriented upwardly so that items can be hooked thereon and suspended from the door hanger 10.

Much like the fixed hanger part 12, the adjustable hook part 14 is constructed with an adjustable extension strip 30 formed with columns and rows of holes, one hole shown as numeral 32. The extension strips 24 and 30 are effective to extend the vertical length of the door hanger 10. The fixed extension strip 24 and the movable extension strip 30 are each constructed so that the columns and rows of holes 26 and 32 align with each other when the extension strips 24 and 30 are attached together. For purposes of visual symmetry, the adjustable hook part 14 is constructed with holes 32 that are aligned with the holes 26 of the fixed hanger part 12, but this is not necessary to the operation of the door hanger 10. As will be described below, only holes can be formed in the fixed hanger extension strip, and the hook members formed in the adjustable hook extension strip, or vice versa.

Figure 6:
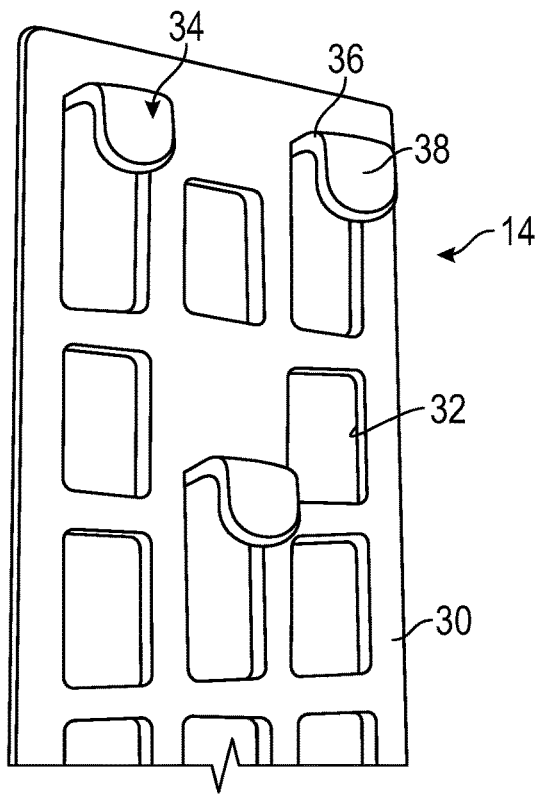
FIG. 6 is an isometric view of a portion of the adjustable hook part illustrating the plural hook members formed thereon and that engage within the holes of the fixed hanger part.
Figure 7:
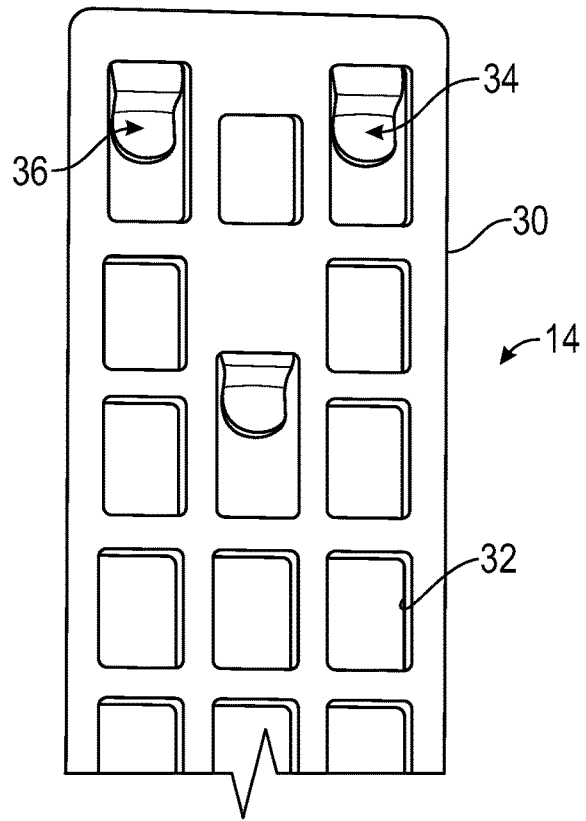
FIG. 7 is an isometric view of the opposite side of the portion of the adjustable hook part of FIG. 6.

FIG. 6 illustrates one side of the upper end of the adjustable hook part 14, and FIG. 7 illustrates the other side. The adjustable hook part 14 is constructed with one or more hook members, one shown as numeral 34. Each hook member 34 can be constructed using a part of the material removed from the extension strip 30 to form a respective hole 32. In practice, the holes 32 are formed by punching openings in the strip of metal material that form the door hanger 10. The hook members 34 of the adjustable hook part 14 are formed with a lateral outwardly extending section 36 which terminates in a downwardly turned end 38. A lateral space between the inside surface of the downward turned end 38 and the vertical surface of the extension strip 30 is at least the same as the thickness of the material forming the fixed hanger part 12. The hook members 34 can be formed by punching three sides of the rectangular opening, so that one side of the rectangular opening remains attached to the strip of material. The punching out of the hole and the bending of the hook member 34 can take place in a single machine operation.

The plural hook members 34 are formed in a pattern such that when the extension strips 24 and 30 are placed together face to face, the hook members 34 of the adjustable hook part 14 can protrude through respective holes 26 of the fixed hanger part 12. Similarly, the hook members 40 and 41 of the fixed hanger part 12 can protrude through respective holes 32 of the adjustable hook part 14. When the hook members 34 protrude through a respective hole 26 in the fixed hanger part 12, and vice versa, the adjustable hook part 14 can be lowered a short distance so that the lateral extending section 36 of each hook member 34 rests on the lower edges of the respective upper hanger part holes 26. At the same time, the lateral extending sections of the hook members 40 and 41 of the fixed hanger part 12 rest under the top edges of the holes 32 through which such hook members 40 and 41 protrude. When engaged in this manner, the fixed hanger part 12 and the adjustable hook part 14 are engaged together and cannot be removed until the adjustable hook part 14 is lifted somewhat so as i) to allow removal of the hook members 34 from the respective upper hanger part holes 26, and ii) to allow removal of the hook members 40 and 41 from the respective adjustable hook part holes 32. With this arrangement, the user of the door hanger 10 can select which horizontal row of holes 26 in the fixed hanger part 12 to use so that the hook 28 of the adjustable hook part 14 is at a desired elevation with respect to the door. For shorter decorations, the user might desire to shorten the effective length of the door hanger 10 so that the decoration hangs higher on the door. Conversely, for longer decorations, the user might want to lengthen the effective length of the door hanger 10 so that the upper part of the decoration is at a desired elevation.

In the extension strip 30 embodiment illustrated in FIGS. 6 and 7, there are three hook members 34, two of which are vertically aligned with the outer column holes 32. A third lower hook member is aligned and centered with the middle column of holes 32. The three hook members 34 form a triangle that are alignable with three corresponding holes 26 that form a triangle in the extension strip 24 of the fixed hanger part 12. The utilization of three hook members 34 formed in the top portion of the adjustable hook part 14 provides a lateral stabilization of the adjustable hook part 14 with respect to the fixed hanger part 12. The lateral or anti-sway stabilization of the parts is enhanced by the utilization of the bottom hook members 40 and 41 of the fixed hanger part 12 engaged within respective holes 32 of the adjustable hook part 14. Stated another way, the extension strips 24 and 30 are attached together using an upper set of hook members that engage an upper set of holes, and a lower set of hook members that engage a lower set of holes.

Importantly, and as noted above, when both the fixed hanger part 12 and the adjustable hook part 14 have holes formed therein and attached together using the hook members, the holes 26 and 32 of both extension strips 24 and 30 align with each other. With this arrangement, there is a visual symmetry to the door hanger 10. As further noted above, those skilled in the art may prefer to construct the adjustable hook part 14 as a planar extension strip with no holes 32. Additionally, the adjustable hook part 14 can be formed with a number of hook members 34 other than three, such as four, five, etc. If four hook members 34 are employed, they could be arranged like the four dots on a side of a die. Similarly, if five hook members 34 are employed, they could be arranged like the five dots on a side of a die, and so on. The same is the case with hook members formed on the fixed extension strip 24.

Figure 8:
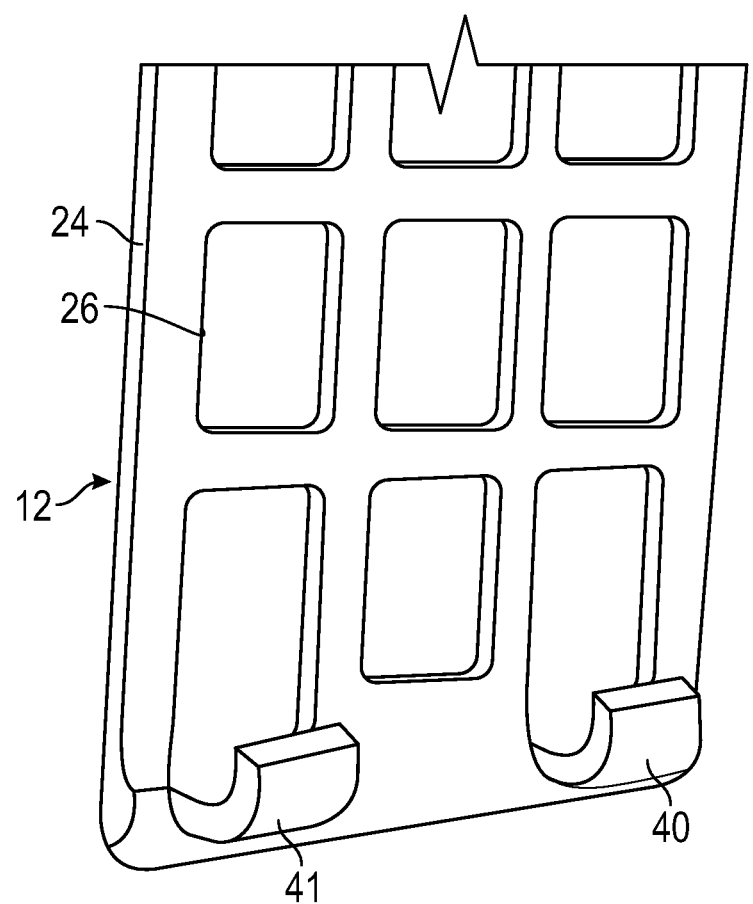
FIG. 8 is an isometric view of a bottom portion of the fixed hanger part showing the hook members formed thereon and that engage with the holes of the adjustable hook part.

FIG. 8 illustrates an arrangement of hook members 40 and 41 formed on the bottom portion of the fixed hanger extension strip 24. Here, there are only two horizontally aligned hook members 40 and 41, and no third hook member as shown with the adjustable hook extension strip 30 of FIGS. 6 and 7. As noted in the extension strips 24 and 30 of FIGS. 6-8, the holes from which the hook members are formed are vertically longer in length than the other holes of the extension strip. This allows all of the holes of both parts 12 and 14 to remain aligned when the extension strips 24 and 30 are attached together.

Figures 9, 10:
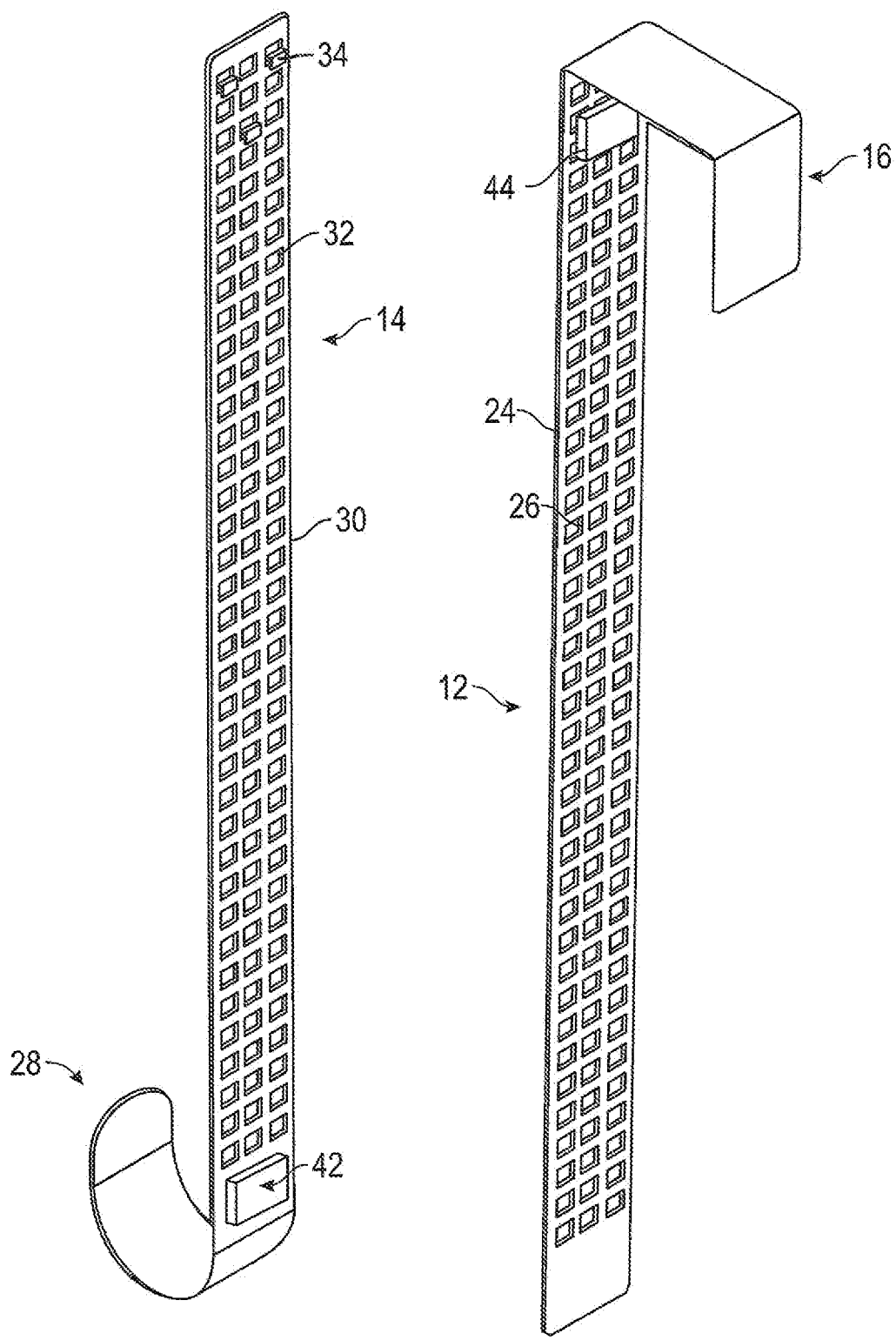
FIG. 9 is an isometric view of the adjustable hook part illustrating the bumper pad attached to the back side thereof.
FIG. 10 is an isometric view of the fixed hanger part illustrating a bumper pad attached thereto.

With reference to FIGS. 9 and 10, there is illustrated a technique for allowing the back surfaces of the fixed hanger part 12 and the adjustable hook part 14 to be spaced from the frontal surface of the door. This may be preferable to prevent the ends of the hook members 34 of the adjustable hook extension strip 30 from contacting the door and marring the surface thereof. To achieve this, the back surfaces of both the fixed hanger part 12 and the adjustable hook part 14 are spaced from the door surface a distance greater than that part of each hook member 34 that protrudes (through the respective holes 26) beyond the back surface of the fixed hanger part 12. In order to achieve this, a felt or rubber standoff or pad 42 can be adhered to bottom part of the adjustable hook part 14, and another pad 44 can be adhered to the top part of the fixed hanger part 12. The thickness of the pads 42 and 44 prevent the ends of the hook members 34 from engaging with the surface of the door and marring of the same.

As an alternative to the use of spacer pads, or in addition thereto, the fixed hanger part 12 and the adjustable hook part 14 can be formed with concave extension strips 24 and 30 where the vertical center of the extension strips 24 and 30 are curved away from the door surface sufficiently such that the hook members 34 do not engage the door surface. Rather than being curved outwardly, the extension strip 24 could be formed as a vertical channel to accomplish the spacing of the hook members 34 away from the door surface.

The embodiments described above are constructed so that the adjustable hook part 14 engages with the fixed hanger part 12 by placing the parts together so that the hook members 34 of the adjustable hook part 14 engage within the holes 26 of the fixed hanger part 12, and vice versa e.g., the hook members 40 and 41 of the fixed hanger part 12 engage within the holes 32 of the adjustable hook part 14. A different arrangement can be accomplished as well, by fabricating one extension strip with only the holes and the other extension strip with only hook members. When the hook members are formed on the fixed hanger part 12, they would have upwardly turned ends rather than downturned ends as when formed on the extension strip 30 of the adjustable hook part 14. If the hook members are all formed on the extension strip 24 of the fixed hanger part 12, then one does not have to be concerned with the hook members marring the surface of the door.

FIGS. 12 and 13 illustrate the foregoing concept, where respective portions of extension strips 60 and 62 can be engaged together at different locations thereon to effective extend the length of the door hanger 10. The apertured extension strip 60 could be associated with the fixed hanger part 12, and the extension strip 62 with hook members could be associated with the adjustable hook part 14. Here, the apertured extension strip 60 is constructed with a single column of holes, one shown as numeral 64, and no hook members. The holes are formed in the metallic material in the same manner described above. While not shown, the hanger member 16 is formed integral with the apertured extension strip 60 at the top thereof.

The extension strip 62 is equipped with plural hook members 66 and 68 and no holes. The hook members 66 and 68 are preferably located near the top of the extension strip 62. The hook members 66 and 68 are formed in the metallic material in the same manner described above. The hook members 66 and 68 can be vertically spaced so that there would be about 5-7 holes of the extension strip 60 therebetween. The strip members 60 and 62 are engaged together by orienting the adjustable hook part 14 with the hook members 66 and 68 of the extension strip 62 facing the extension strip 60 of the fixed hanger part 12. The user selects the two holes 64 of the extension strip 60 that represents the effective desired length of the door hanger 10, and then inserts the hook members 66 and 68 therein. The adjustable hook part 14 is then lowered somewhat until the lateral part of the hook members 66 and 68 engage the respective bottom edges of the holes 64 of the extension strip 60. The length of the door hanger 10 can be made shorter or longer by selecting other holes of the extension strip 60 for insertion therein of the hook members 66 and 68.

There are variations of the extension strips 60 and 62 of FIGS. 12 and 13. The apertured extension strip 60 could be associated with the adjustable hook part 14, and the extension strip 62 with the hook members 66 and 68 could be associated with the fixed hanger part 12. With this arrangement, the hook members 66 and 68 would be formed in an upturned orientation and preferably located near the bottom of the extension strip 62. In both variations, more than two hook members can be utilized.

Figure 11:
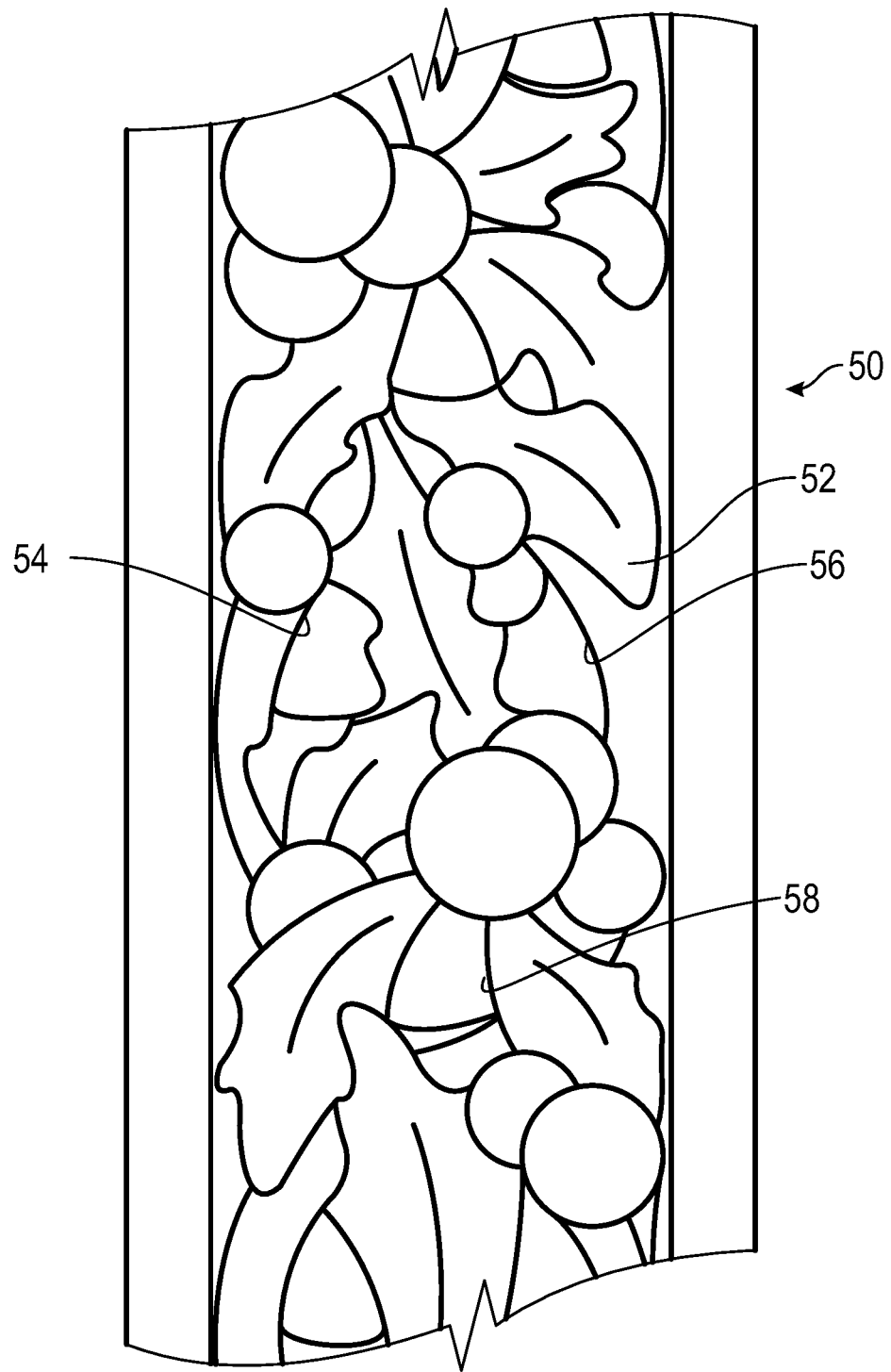
FIG. 11 is a frontal view of a portion of the adjustable hook part of the door hanger illustrating an ornamental design thereof.

The door hanger 10 need not be constructed so that the holes 26 and 32 are easily perceptile to the eye. Rather, the fixed hanger part 12 and the adjustable hook part 14 can be constructed with a decorative design where the holes are not readily visible. This feature is illustrated in FIG. 11 where the door hanger 50 is constructed with a decorative design to resemble holly leaves 52 and berries. Here, the holes 54, 56 and 58 constitute the spaces between the holly leaves 52 and berries, and are not round or square, but natural irregular shapes. The hook members (not shown) need not be the same shape as openings between the holly leaves 52 and berries, but the hook members can be of various shapes. Many other designs can be employed to match the season or holiday that is related to the type of decoration to be hung from the door hanger 10.

As can be appreciated from the foregoing, the adjustable hook part 14 remains engaged with the fixed hanger part 12 due to the force of gravity which forces the adjustable hook part 14 downwardly. This downward force tends to maintain the hooks 40 and 41 engaged within the respective holes 32 of the adjustable hook part 14. The hooks 40 and 41 can be fabricated so that inadvertent disengagement from the respective holes 32 is less likely. However, it has been found that the relative dimensions of the hooks 40 and 41, as well as the holes 32, may be different depending whether the fixed hanger part 12 and the adjustable hook part 14 are to be coated with a thin plating, or a thicker powder coat. If the parts 12 and 14 are to be plated with a thin coating of material, and the hooks 40 and 41 interlock with the respective holes 32 with a tight fit, then the same parts would fit too tightly when powder coated. This concern is overcome by constructing the parts with tolerances for powder coating, and then employing a stopper to hold the fixed hanger part 12 engaged with the adjustable hook part 14 if the parts are plated. Thus, the same identical parts 12 and 14 can be fabricated where one batch is plated and another batch is powder coated.

Figure 14:
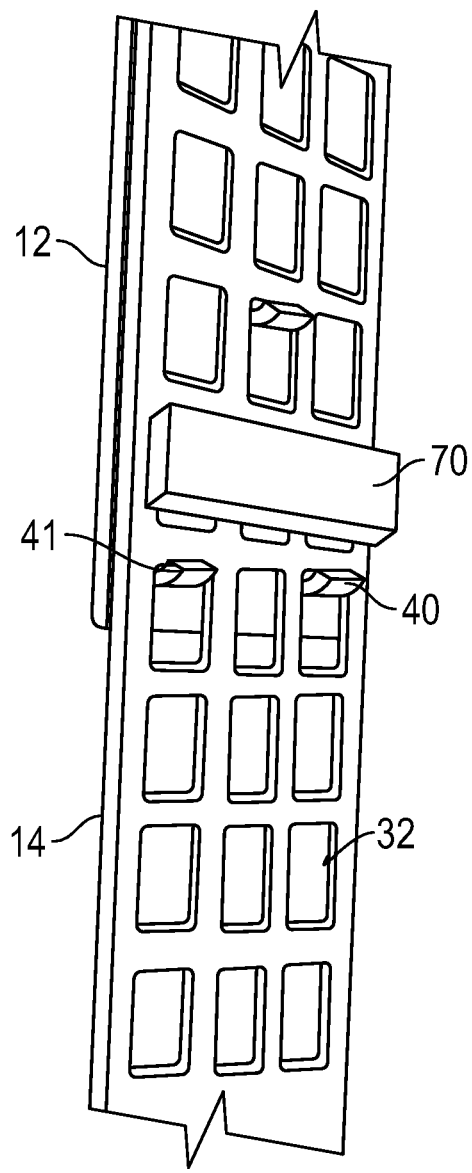
FIG. 14 is an isometric view of a back portion of the extension strips engaged together, with a stopper to prevent inadvertent disengagement.
Figure 15:
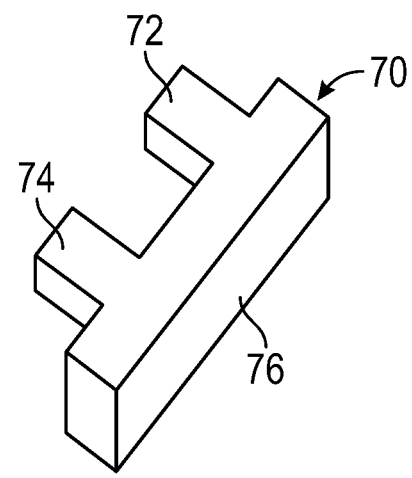
FIG. 15 is an isometric view of the stopper illustrated in FIG. 14.

FIG. 14 illustrates the stopper 70 inserted through the pair of holes 32 of the adjustable hook part 14 as well as through an aligned pair of holes 26 of the fixed hanger part 12. The stopper 70 is friction fit within both sets of holes 32 and 26, and can be pulled out when it is desired to readjust the parts 12 and 14 as to length. FIG. 15 is an isometric view of the stopper 70. The stopper 70 is preferably constructed of a soft silicon material that is pliable and easily pushed into the aligned sets of holes 26 and 32. A pair of studs 72 and 74 is formed integral with a connecting handle part 76 of the stopper 70. As can be appreciated, when the fixed hanger part 12 is engaged with the adjustable hook part 14, via the hooks 40 and 41 and holes 32, the studs 72 and 74 of the stopper 70 are inserted into the pair of aligned holes of both parts 12 and 14. This prevents relative vertical movement of the adjustable hook part 14 with respect to the fixed hanger part 12, thereby preventing inadvertent removal of the hooks 40 and 41 from the holes 32. This advantage exists irrespective of whether the parts 12 and 14 are plated or powder coated. Preferably, the stopper 70 is inserted within aligned holes just above the hooks 40 and 41, as illustrated in FIG. 14.

In addition to preventing relative vertical movement between the fixed hanger part 12 and the adjustable hook part 14, the connecting handle part 76 of the stopper 70 engages with the surface of the door and prevents the ends of the hooks 40 and 41 from touching the door surface and marring the same. A second stopper (not shown) can be employed in the bottom set of holes of the adjustable hanger part 14 to also prevent the back side of the hook 28 from marring the surface of the door.

While the preferred embodiment described above is constructed to display an ornament on one side of the door, the fixed hanger part can be constructed with dual extension strips, one for each side of the door. In this event, two adjustable hook parts would be employed so that an ornament can be displayed on each side of the door.

While the preferred and other embodiments of the invention have been disclosed with reference to specific over-the-door hanger components, and associated methods of fabrication thereof, it is to be understood that many changes in detail may be made as a matter of engineering or design choices without departing from the spirit and scope of the invention, as defined by the appended claims.

What is claimed is:

1. An over-the-door hanger for hanging a decorative item on a door, comprising:
    a fixed hanger part having a hanger member located at a top portion thereof for placing said over-the-door hanger on a top edge of the door, said fixed hanger part having an extension strip depending downwardly from said hanger member, and said extension strip being integral with said hanger member;
    an adjustable hook part having a hook located at a bottom portion thereof for suspending the decorative item therefrom, said adjustable hook part having an extension strip extending upwardly from said hook, and the extension strip of said adjustable hook part being integral with said hook;
    a vertical arrangement of holes formed in one said extension strip, and at least three hook members formed on the other said extension strip, said at least three hook members adapted for engaging within respective said holes of said vertical arrangement of holes;
    said vertical arrangement of holes including at least two vertical columns of holes formed in said one extension strip;
    said hook members arranged on said other extension strip in a triangle so that each said hook member is located at an apex of the triangle, and so that each said hook member is engageable within a respective hole formed in said one extension strip, whereby when said at least three hook members of said other extension strip are engaged within respective holes of said one extension strip, said one extension strip resists lateral movement of the hook of said adjustable hook part with respect to said other extension strip, and
    whereby when said at least three hook members are engaged within said vertical arrangement of holes at different vertical locations, the decorative item suspended from said hook can be located at a desired vertical location with respect to the door.

2. The over-the-door hanger of claim 1, wherein the extension strip of said fixed hanger part includes said holes, and said adjustable hook part includes said at least three hook members.

3. The over-the-door hanger of claim 2, wherein the extension strips of both said fixed hanger part and said adjustable hook part are formed with rows and columns of said holes therein.

4. The over-the-door hanger of claim 2, wherein said adjustable hook part is formed with an ornamental design having one or more different design features, and wherein said holes are formed between the different design features.

5. The over-the-door hanger of claim 1, wherein the extension strip of said adjustable hook part includes said at least two vertical columns of holes, and the extension strip of said fixed hanger part also includes at least two columns of holes, and when said adjustable hook part is engaged with said fixed hanger part via said one or more hook members, the holes of said fixed hanger part and the holes of said adjustable hook part align with each other.

6. The over-the-door hanger of claim 5, further including a stopper that is inserted within aligned holes of the fixed hanger part and the adjustable hook part to prevent relative vertical movement therebetween.

7. The over-the-door hanger of claim 1, wherein two of said at least three hook members are arranged on said other extension strip laterally spaced apart and engageable within two respective laterally spaced holes formed in said one extension strip, and a third said hook member of said at least said three hook members is spaced vertically with respect to said two laterally spaced hook members, and said third hook member is engageable within a third said hole that is vertically spaced from said two laterally spaced holes, whereby with said arrangement of hook members and holes, said one extension strip is stabilized with respect to said other extension strip.

8. The over-the-door hanger of claim 1, wherein said vertical arrangement of holes is formed along substantially an entire vertical length of said one extension strip.

9. The over-the-door hanger of claim 1, wherein said hook members are formed using material punched out of said other extension strip to fabricate a respective said hole.

10. The over-the-door hanger of claim 9, wherein each said hook member includes a lateral extension and a downturned end.

11. The over-the-door hanger of claim 1, further including means for preventing said hook members from marring a surface of the door.

12. An over-the-door hanger for hanging a decorative item on a door, comprising:
    a fixed hanger part having a hanger member for hanging said over-the-door hanger on the door, said fixed hanger part having an extension strip with at least one vertical column of holes and with at least one hook member;
    an adjustable hook part having a hook for suspending the decorative item therefrom, said adjustable hook part having an extension strip with at least one column of vertical holes and with at least one hook member, each said hook member of said adjustable hook part adapted for engaging within a respective said hole of said fixed hanger part, and each said hook member of said fixed hanger part adapted for engaging within a respective said hole of said adjustable hook part, whereby the hook members can be engaged with respective said holes at different vertical locations to thereby locate the decorative item suspended from said hook at a desired location with respect to the door; and when said fixed hanger part and said adjustable hook part are engaged together via said hook members and respective holes, a portion of the extension strip of said fixed hanger part overlaps a portion of the extension strip of said adjustable hook part, and the holes of the overlapping extension strip of said fixed hanger part align with the holes of the overlapping extension strip of said adjustable hook part.

13. The over-the-door hanger of claim 12, wherein said hook members are formed from a part of a material from which a respective said hole was formed.

14. The over-the-door hanger of claim 13, wherein a portion of said hook members form respective edges of the respective said holes.

15. The over-the-door hanger of claim 12, wherein said fixed hanger part includes plural columns of said holes, and plural rows of said holes.

16. The over-the-door hanger of claim 15, wherein said adjustable hook part comprises at least two said hook members engageable within two corresponding holes in different columns of holes formed in the extension strip of said fixed hanger part, and said fixed hanger part comprises at least two hook members engageable within two corresponding holes in different columns of holes formed in the extension strip of said adjustable hook part.

17. A method of adjusting an over-the-door hanger for hanging a decorative item on a door, comprising:

installing a fixed hanger part of said over-the-door hanger over a top edge of the door so that an extension strip attached to said fixed hanger part lies adjacent a face surface of the door, and wherein said fixed hanger part includes a plurality of holes formed therein;

manipulating an adjustable hook part having an extension strip attached to a hook for hanging the decorative item therefrom, and attaching the extension strip of said adjustable hook part to the extension strip of said fixed hanger part, and wherein said adjustable hook part includes a plurality of holes formed therein;

selecting one or more holes of a said plurality of holes formed in one said extension strip that should be employed to hang the decorative item at a desired vertical location with respect to the door;

engaging at least one hook member formed on the other of said extension strips within the selected one or more holes to thereby hang the decorative item at the desired vertical location, and when the extension strips of said fixed hanger part and said adjustable hook part are engaged together, and when the holes of both said extension strips are aligned, inserting a plug through at least one hole of said fixed hanger part and into an aligned hole of said adjustable hook part to prevent relative vertical movement between said extension strips.

18. The method of claim 17, further including using a plug with two studs, and inserting each said stud into a different aligned hole.

19. The method of claim 18, further including using a plug constructed of a pliable material.

20. The method of claim 17, further including using said plug for abutment with the face surface of the door to prevent marring of the door by the over-the-door hanger.

\* \* \* \* \*